(12) United States Patent
Todd

(10) Patent No.: US 9,160,759 B2
(45) Date of Patent: *Oct. 13, 2015

(54) SECURITY SYSTEM FOR PROTECTING NETWORKS FROM VULNERABILITY EXPLOITS

(71) Applicant: Hewlett-Packard Development Company, L.P., Houston, TX (US)

(72) Inventor: Michael Todd, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 389 days.

This patent is subject to a terminal disclaimer.

(21) Appl. No.: 13/760,944

(22) Filed: Feb. 6, 2013

(65) Prior Publication Data

US 2013/0152163 A1 Jun. 13, 2013

Related U.S. Application Data

(62) Division of application No. 11/669,815, filed on Jan. 31, 2007, now Pat. No. 8,391,288.

(51) Int. Cl.
H04L 29/06 (2006.01)

(52) U.S. Cl.
CPC ......... *H04L 63/1416* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 5,850,449 A | 12/1998 | McManis | |
| 6,011,910 A | 1/2000 | Chau et al. | |
| 7,409,719 B2 | 8/2008 | Armstrong et al. | |
| 7,886,349 B2 | 2/2011 | Taglienti et al. | |
| 8,391,288 B2* | 3/2013 | Todd | 370/392 |
| 2003/0105976 A1* | 6/2003 | Copeland, III | 713/201 |
| 2004/0088571 A1* | 5/2004 | Jerrim et al. | 713/201 |
| 2004/0111626 A1 | 6/2004 | Livny | |
| 2004/0143734 A1* | 7/2004 | Buer et al. | 713/153 |
| 2006/0209718 A1 | 9/2006 | Kinsey et al. | |
| 2007/0011319 A1* | 1/2007 | McClure et al. | 709/224 |
| 2007/0106993 A1 | 5/2007 | Largman et al. | |
| 2008/0005782 A1* | 1/2008 | Aziz | 726/3 |
| 2008/0022388 A1 | 1/2008 | Grewal et al. | |
| 2008/0043632 A1 | 2/2008 | Tripathi et al. | |
| 2008/0148341 A1* | 6/2008 | Ferguson et al. | 726/1 |
| 2008/0163207 A1 | 7/2008 | Reumann et al. | |

* cited by examiner

*Primary Examiner* — Timothy J Weidner
(74) *Attorney, Agent, or Firm* — Lowe Hauptman Gilman & Berner, LLP

(57) ABSTRACT

A system for protecting networks from vulnerability exploits comprises a security engine operable to receive a packet destined for a user's network and forward the packet to at least one host virtual machine for processing. The security engine is further operable to forward the stored packet to the user's internal network based upon a result of the processed packet. A method of securing a network from vulnerability exploits is described. The method comprises receiving a packet destined for a user's internal network; forwarding the packet to at least one virtual machine based upon a virtual machine configuration table; processing the forwarded packet on the at least one virtual machine; and releasing the packet to the user's internal network based upon results of the processing.

19 Claims, 3 Drawing Sheets

SECURITY SYSTEM FOR PROTECTING NETWORKS FROM VULNERABILITY EXPLOITS

CLAIM FOR PRIORITY

The present application is a Divisional Application of commonly assigned and U.S. patent application Ser. No. 11/669,815, filed on Jan. 31, 2007, the disclosure of which is incorporated by reference herein in its entirety.

BACKGROUND

Intrusion Prevention Systems (IPS) are used to protect computer networks against malicious incoming traffic. However, the effectiveness of an IPS is limited due to the fact that an IPS only blocks traffic for which it has a "signature." A signature being a specific rule for content filtering to detect electronic threats. Accordingly, an IPS may not block an exploit for a vulnerability the vendor is not aware of, or for which there is no patch available. A zero-day exploit is one that takes advantage of a security vulnerability on the same day that the vulnerability becomes generally known, or before a signature has been developed and the exploit is in circulation (in the wild).

Zero-day protection is the ability to provide protection against zero-day exploits. Because zero-day attacks are generally unknown to the public, it is often difficult to defend against them. Zero-day attacks are often effective against "secure" networks and can remain undetected even after they are launched.

Techniques exist to limit the effectiveness of zero-day memory corruption-type vulnerabilities, such as buffer overflows. These protection mechanisms exist in contemporary operating systems such as SUN MICROSYSTEMS SOLARIS, LINUX, UNIX, and UNIX-like environments. Versions of MICROSOFT WINDOWS XP Service Pack 2 and later include limited protection against generic memory corruption-type vulnerabilities. Desktop and server protection software also exists to mitigate zero-day buffer overflow vulnerabilities. Typically, these technologies involve heuristic determination analysis, stopping the attacks before they cause any harm. However, this type of analysis is prone to a high incidence of false positive results.

DESCRIPTION OF THE DRAWINGS

The present invention is illustrated by way of example, and not by limitation, in the figures of the accompanying drawings in which elements having the same reference numeral designations represent like elements throughout and wherein.

DETAILED DESCRIPTION

Figure 1:
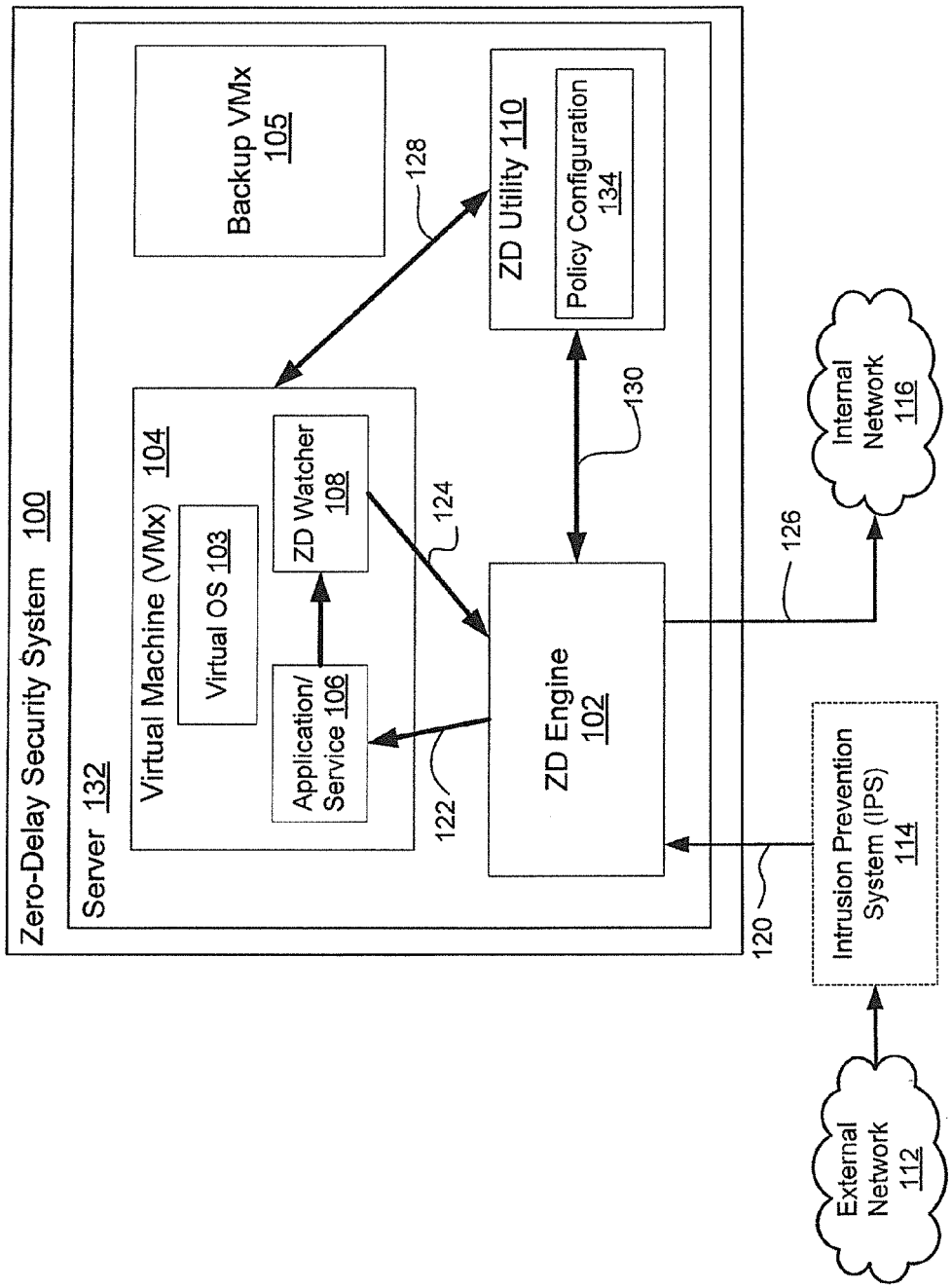
FIG. 1 is a block diagram of a zero-day security system according to an embodiment of the present invention.

FIG. 1 depicts a block diagram of a zero-day (ZD) security system 100 operable to host a plurality of virtual machines (VMx) 104 comprising images of operating systems and applications executed by virtual hardware, e.g., emulated hardware and/or virtualized hardware and/or software. Under control of ZD Engine 102, security system 100 buffers incoming traffic from an external network 112 intended for hosts on a company's internal network 116. Receiving the traffic over a communication channel 120, ZD Engine 102 forwards the incoming traffic to at least one virtual machine 104 over communication channel 122.

Virtual machines 104 comprise applications and services similar to the applications and services hosted on the user's internal network, i.e., the intended hosts, and are operable to process the received packets, simulating the processing that the intended hosts would perform. Virtualization allows multiple virtual machines 104, with heterogeneous operating systems to run in isolation, side-by-side on the same physical machine. Each virtual machine 104 has its own set of virtual hardware (e.g., random access memory (RAM), central processing unit (CPU), network interface card (NIC), etc.) upon which an operating system 103 and applications/services 106 are loaded and executed. In this manner, an incoming packet sees a consistent operating system 103 and a normalized set of hardware regardless of the actual physical hardware components, and allows the security system 100 to simulate the user's infrastructure.

In some embodiments, incoming data packets from an external network 112 are first received by a signature or heuristic-based intrusion prevention system (IPS) 114 prior to being received by the ZD security system 100. The IPS 114 is configured to provide a first level of security against malicious traffic. Although IPS 114 is not required, the use of an IPS decreases latency in the overall security system by decreasing malicious traffic that may cause one or more virtual machines 104 to fail. To reduce latency in this or other embodiments, system 100 may comprise a duplicate image 105 each virtual machine 104 to which incoming traffic 120 is directed if the first image fails 104. In some embodiments, the image may be of the entire virtual machine 104, including the virtual OS 103, application/service 106 and ZD Watcher 108. In other embodiments, the back-up image 105 comprises the only the state, e.g., stack and volatile data portion, of the virtual machine 104.

After allowing the virtual machines to process the packet for a predetermined period of time, ZD Watcher 108 determines the status of the port that received the packet and communicates the status to ZD Engine 102 over link 124. Based upon a received status and instituted security polices, ZD Engine 102 determines whether or not to release the buffered packet to the user's internal network 116 over link 126 that in some embodiments may connect to one or more internal network servers, not shown.

ZD Utility 110 comprises a third component of ZD security system 100 that is in communication with ZD Engine 102 and each virtual machine 104. By operation of a user interface, e.g., a keyboard and display terminal, ZD Utility 110 allows a user to configure at least one security policy, e.g., policy configuration 134; ZD Engine configurations; VM configurations; and monitor CPU utilization and status of virtual machine instances (VMx). The status monitoring aspect of ZD Utility 110 is operable to monitor the status of each virtual machine process, e.g., applications 106 and ZD Watcher 108. In some embodiments, the ZD Utility 110 may, if a process fails to respond or is otherwise inoperable, replace the failed VM instance with a back-up, e.g., backup image 105, while the halted instance is restarted. In other embodiments, a part of policy configuration 134 may allow a user to choose to have at least a portion of the failed instance saved for further analysis.

In some embodiments, ZD security system 100 comprises a server 132 that executes the processes comprises ZD security system 100 and which are in communication with IPS 114 and internal network 116. In some particular embodiments, server 132 may include a HP PROLIANT DL360 rack server executing a LINUX-based Operating System (OS).

In some embodiments, such as when a virtual machine 104 is hosted on the same server as the ZD engine 102, e.g., server 132, links 122, 124, 128, and 130 only comprise inter-process communication channels. In other embodiments, wherein one or more virtual machines 104, and/or ZD Engine 102 are separate servers, these links may include one or more physical interconnection, such as an interprocessor cable.

ZD Engine 102 is not limited to protecting against zero-day exploits. Another aspect of ZD security system 100 includes being used as a tool to capture new exploits and analyze the behavior of the exploits.

Figure 2:
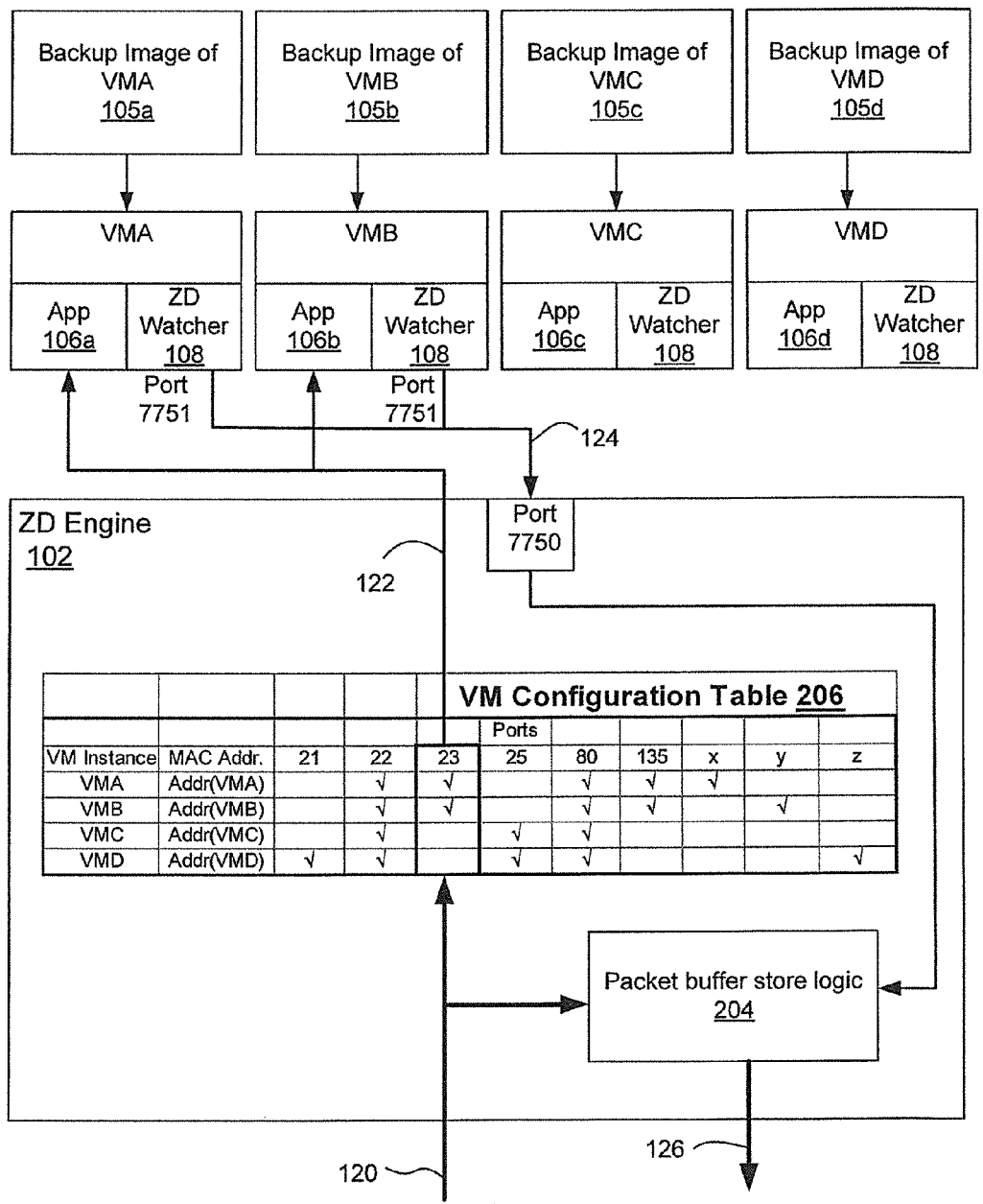
FIG. 2 is an exemplary four virtual machine embodiment of the zero-day security system illustrated in FIG. 1.

FIG. 2 illustrates one embodiment of ZD security system 100 comprising four virtual machine instances, i.e., VMA, VMB, VMC, and VMD, connected to ZD Engine 102. In some embodiments, two virtual machines execute MICROSOFT WINDOWS 2003 operating system with INTERNET INFORMATION SERVER, and the third and fourth virtual machine execute a LINUX Operating System with an APACHE web server installed. Furthermore, the number of redundant virtual machines is non-limiting and is a function of the capabilities of server 132 and the user's environment. In addition, the specific configuration of the virtual machine, e.g., operating system, applications, services, communication ports, etc., is configurable to fit a customer's infrastructure and to test those features and services supported.

At step 304, packets destined for specified hosts on the internal network 116 are diverted over communications link 120 to ZD Engine 102. ZD Engine 102, e.g., a software program executing on server 132, controls the operation of the ZD security system 100 and via buffer logic 204 stores and forwards each packet to one or more virtual machines (VMx) based upon VM configuration table 206. ZD Engine 102 continuously checks the status, e.g., port status, of each VMx to which the ZD Engine 102 has sent the packet and makes a decision to block or forward the packet based upon the received status and the security policy configuration 134 invoked.

ZD Engine 102 is responsible for maintaining the VM configuration table 206, which comprises a list of configured virtual machine instances 104, the media access control (MAC) address of the virtual machine instance, and the ports and services on each virtual machine, VMA-VMD, operable to test incoming packets. As indicated in VM Configuration Table 206, of the four virtual machines, only virtual machines VMA and VMB process traffic on port 23.

Figure 3:
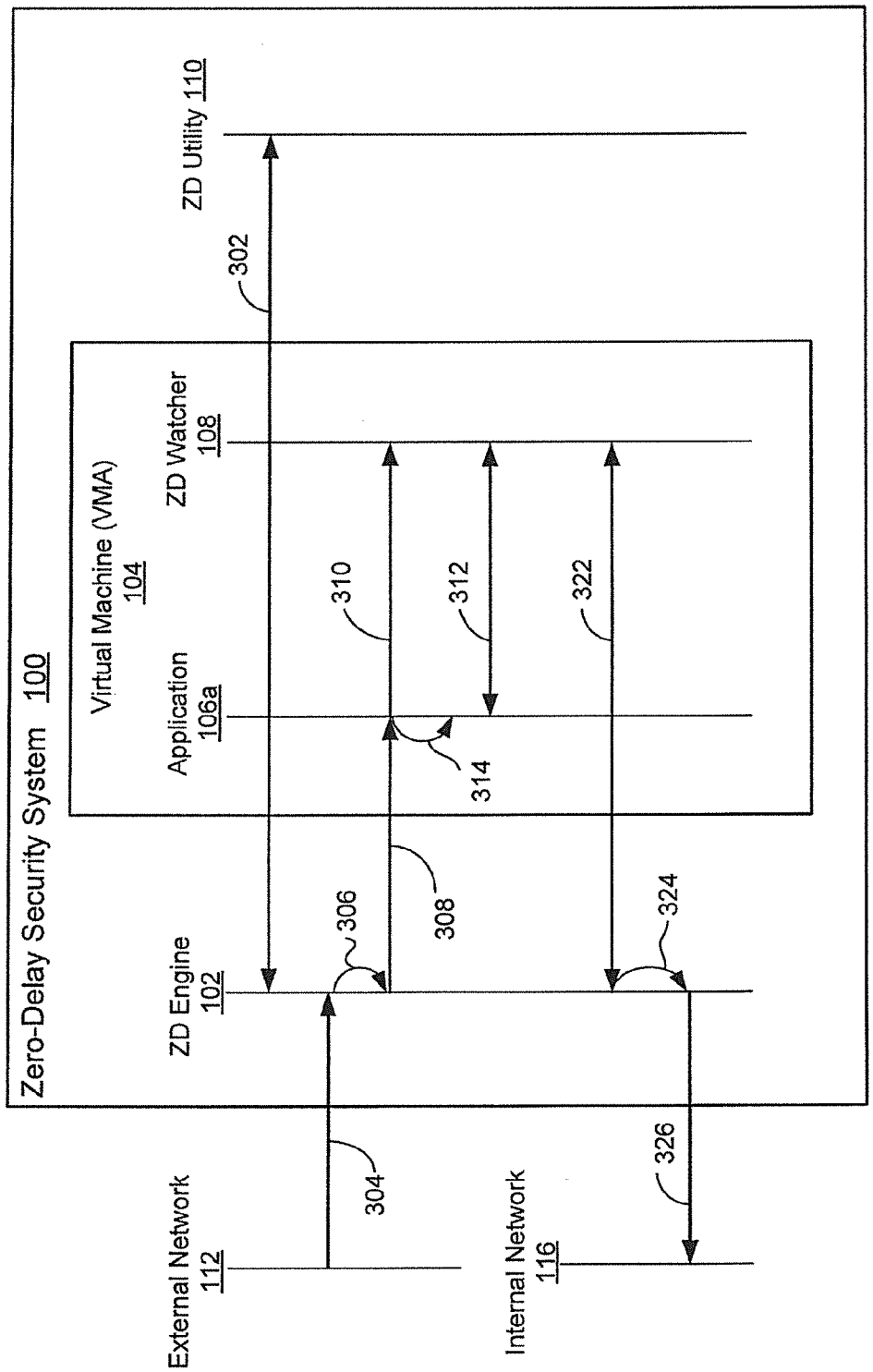
FIG. 3 is an exemplary message sequence diagram according to an embodiment of the zero-day system illustrated in FIG. 1.

By way of example, FIGS. 2 and 3 illustrates one embodiment of a block diagram and method of implementing the zero-day security system of FIG. 1. At function 302 a security policy 134 may be downloaded to ZD Engine 102 upon which the ZD Engine 102 processes status information received from each VM 104.

At function 304, a packet destined for an application on port 23 is received by ZD Engine 102 over link 120. At function 306, buffer logic 204 stores and forwards, at function 308, the packet to VMA and VMB over communication channels 122, based upon VM configuration table 206.

ZD Watcher program 108, installed on each virtual machine, VMA-VMD, monitors is operable to track, at functions 310 and 312, the packet sequence number and destination port number of each packet sent to the virtual machines, VMA-VMD. Prior to receiving the packet, port 23 should be in a "LISTEN" state. Upon receipt of the packet, the application 106 processes the packet at function 314, and unless the packet has adversely affected the operation of the application 106/virtual machine 104, port 23 should still be in a "LISTEN" state.

In some embodiments ZD Watcher 108 checks port status approximately 50 microseconds after the initial tracking of the packet at function 310 to ensure that the port in receipt of the packet, e.g., port 23, is still in a "LISTEN" state. If the application, e.g., 106a, is in a "LISTEN" state, ZD Watcher 108 sends, at function 322, an "OK" message over communication channel 124 to ZD Engine 102 that includes the associated packet sequence number.

ZD Watcher 108 transmits VM status to the ZD Engine 102 over communication channel 124 through predetermined ports, e.g., ports 7750 and 7751, on ZD Engine 102 and ZD Watcher 108, respectively. Furthermore, inter-process communication allows the ZD Watcher 108 to obtain VM application configuration information from the ZD Engine 102.

In some embodiments, the ZD Engine 102 waits, at function 324, for receipt of an "OK" message from the virtual machines, i.e., VMA and VMB, responsible for processing the original packet destined for port "23," before buffer logic 204 transmits, at function 326, the original packet to the internal network 116 over link 126. In other embodiments, depending upon the user environment and the security policy stored in security policy configuration 134 of ZD Utility 110, ZD Engine 102 may forward the packet prior to receiving a response from the virtual machines VMA and VMB processing the packet.

Based upon the above description, a malicious packet attempting to exploit a zero-day vulnerability on port 23 may be successful in crashing virtual machines VMA and VMB. However, their respective ZD Watcher 108 programs detect the crash and notify ZD Engine 102 of both the crash and the packet sequence number of the malicious packet that initiated the crash. Accordingly, the offending packet is blocked from the internal network.

The functions of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a computing device or user terminal. In the alternative, the processor and the storage medium may reside as discrete components in a computing device or user terminal.

What is claimed is:

1. A security engine comprising:
a data store on which is stored a virtual machine configuration table that maintains a list of configured virtual machine instances;
a packet buffer store logic that is to,
receive a plurality of packets;
store the received plurality of packets;
forward the received plurality of packets to the plurality of virtual machines based upon information contained in the virtual machine configuration table, wherein the virtual machines are to process the plurality of packets and to generate status information regarding whether or not the plurality of packets negatively affected the virtual machines to the security engine;
receive the status information; and
process the received status information to determine whether or not to release the received plurality of packets into an internal network.

2. The security engine according to claim 1, wherein the packet buffer store logic is to forward the plurality of packets to one of the plurality of virtual machines based upon the information contained in the virtual machine configuration table.

3. The security engine according to claim 1, wherein the virtual machine configuration table also maintains a media access control address of the virtual machine instances and ports and services on each of the virtual machines that are to process the plurality of packets.

4. The security engine according to claim 3, wherein the virtual machine configuration table indicates which of the virtual machines is to process traffic on which of the ports that the received plurality of packets are destined.

5. The security engine according to claim 4, wherein the packet buffer store logic is further to:
forward the received plurality of packets to a particular virtual machine of the plurality of virtual machines based upon an identification in the virtual machine configuration table that the particular virtual machine is to process packets on a particular port to which the received plurality of packets are destined.

6. The security engine according to claim 5, wherein the packet buffer store logic is further to:
monitor an operational state of the particular virtual machine; and
execute a backup virtual machine in response to a determination that the particular virtual machine has failed.

7. The security engine according to claim 1, wherein the packet buffer store logic is further to:
access a security policy; and
process the received status information based upon the accessed security policy to determine whether or not to release the received plurality of packets into the internal network.

8. The security engine according to claim 1, wherein the packet buffer store logic is further to receive the plurality of packets from an external network, and to release the received plurality of packets to the internal network in response to a determination that the received plurality of packets did not negatively affect a virtual machine of the plurality of virtual machines and to not release the received plurality of packets to the internal network in response to a determination that the received plurality of packets negatively affected a virtual machine of the plurality of virtual machines.

9. The security engine according to claim 1, wherein the packet buffer store logic comprises a hardware component.

10. The security engine according to claim 1, further comprising:
a memory on which stored a machine readable instructions defining the packet buffer store logic; and
a processor to implement the machine readable instructions.

11. A method comprising:
receiving a plurality of packets from an external network;
storing the received plurality of packets in a buffer;
forwarding the received plurality of packets to a selected virtual machine of a plurality of virtual machines based upon information contained in a virtual machine configuration table, wherein the virtual machines are to process the plurality of packets and to generate status information regarding whether or not the plurality of packets negatively affected the selected virtual machine to the security engine;
receiving the status information from the selected virtual machine;
processing the received status information to determine whether or not to release the received plurality of packets into an internal network; and
retaining the received plurality of packets from being released into the internal network in response to a determination that the received plurality of packets are not to be released into the internal network.

12. The method according to claim 11, wherein the virtual machine configuration table indicates which of the virtual machines is to process traffic on which of the ports that the received plurality of packets are destined, and wherein forwarding the received plurality of packets to the selected virtual machine further comprises forwarding the received plurality of packets to the selected virtual machine based upon an identification in the virtual machine configuration table that the selected virtual machine is to process packets on a particular port to which the received plurality of packets are destined.

13. The method according to claim 12, further comprising:
monitoring an operational state of the selected virtual machine; and
executing a backup virtual machine in response to a determination that the particular virtual machine has failed.

14. The method according to claim 11, further comprising:
accessing a security policy; and
wherein processing the received status information further comprises processing the received status information based upon the accessed security policy to determine whether or not to release the received plurality of packets into the internal network.

15. The method according to claim 11, further comprising:
releasing the received plurality of packets to the internal network in response to a determination that the received status information indicates that the received plurality of packets did not adversely affect the selected virtual machine.

16. A virtual machine apparatus comprising:
a memory on which is stored machine readable instructions to:
receive a plurality of packets;
implement an application that processes the received plurality of packets, wherein the application simulates an application in an internal network;
determine a status of a port through which the plurality of packets were received based upon whether or not the received plurality of packets adversely affected the application; and
communicate the status of the port to a security engine, wherein the security engine is to determine whether or not to release the plurality of packets to the internal network based upon the communicated status of the port; and
a processor to implement the machine readable instructions.

17. The virtual machine apparatus according to claim 16, wherein the machine readable instructions are further to:
track a packet sequence number and destination port of the received plurality of packets;
check, after a predetermined time, the status of the port to which the received plurality of packets are destined; and transmit the packet sequence number and the status of the port to the security engine.

18. A method comprising:

receiving a plurality of packets from a security engine;

implementing an application that processes the received plurality of packets, wherein the application simulates an application in an internal network;

determining a status of a port through which the plurality of packets were received based upon whether or not the received plurality of packets adversely affected the application; and communicating the status of the port to the security engine, wherein the security engine is to determine whether or not to release the plurality of packets to the internal network based upon the communicated status of the port.

19. The method according to claim 18, further comprising:

tracking a packet sequence number and destination port of the received plurality of packets;

checking, after a predetermined time, the status of the port to which the received plurality of packets are destined; and wherein communicating the status of the port further comprises communicating the packet sequence number and the status of the port to the security engine.

* * * * *